(12) United States Patent
Chillariga et al.

(10) Patent No.: US 7,643,423 B2
(45) Date of Patent: Jan. 5, 2010

(54) DYNAMIC CHANNEL ALLOCATION IN MULTIPLE-ACCESS COMMUNICATION SYSTEMS

(76) Inventors: Gopal Chillariga, 125 Connemara Way, #160, Sunnyvale, CA (US) 94087; Rohit Kaushal, 20197 Northbrook Sq., Cupertino, CA (US) 95014; Bhupal Kanaiyalal Dharia, 10768 Maxine Ave., Mountain View, CA (US) 95014; Lance Kazumi Uyehara, 1026 Del Cambre Dr., San Jose, CA (US) 95129; Gerhard Albert Koepf, 700 Kalmia Ave., Boulder, CO (US) 80304-1738; Kevin Dean Raack, 2010 Lynn Ave., Los Gatos, CA (US) 95032; Ujjal Kumar Ghoshtagore, 4333 E. 2nd St., Long Beach, CA (US) 90803

( * ) Notice: Subject to any disclaimer, the term of this patent is extended or adjusted under 35 U.S.C. 154(b) by 492 days.

(21) Appl. No.: 11/507,789

(22) Filed: Aug. 21, 2006

(65) Prior Publication Data

US 2007/0042786 A1 Feb. 22, 2007

Related U.S. Application Data

(63) Continuation of application No. 09/753,182, filed on Jan. 2, 2001, now Pat. No. 7,177,298.

(60) Provisional application No. 60/175,055, filed on Jan. 7, 2000.

(51) Int. Cl.
*H04L 12/26* (2006.01)
(52) U.S. Cl. ..................................... 370/235; 370/432
(58) Field of Classification Search ......... 370/231–235, 370/236, 329–330, 335–337, 341, 342–345, 370/347–348, 395.3–395.43, 436–444
See application file for complete search history.

(56) References Cited

U.S. PATENT DOCUMENTS 4,797,947 A 1/1989 Labedz (Continued)

FOREIGN PATENT DOCUMENTS

EP 0622911 11/1994

(Continued)

OTHER PUBLICATIONS

Duda, at al., "Pattern Classification and Scene Analysis", John Wiley & Songs, 1973, pp. 114-126.
Beraldi et al., "A New Dynamic Reservation Multiple Access Protocol for Supporting Multimedia Traffic in Third Generation Cellular System", Singapore ICCS '94 Conference Proceedings (CAT No. 94$^{th}$0691-6), Proceedings of ICCS '94, Singapore, Nov. 14-18, 1994, pp. 314-319, vol. 1, XP002172387, New York, NY, US, IEEE, USA ISBN: 0-78-032046-8, p. 315.

(Continued)

*Primary Examiner*—Thai D Hoang

(57) ABSTRACT

Dynamic allocation of communication channels among communication units (CU) in a communications system. Dynamic channel allocation employs a reservation set for reserving channels and an allocation set corresponding to the reservation set for receiving allocated channels. The reservation set and the allocation set are changed dynamically as a function of network parameters to control the dynamic channel operation. Reservation set information is broadcast downlink to multiple users to reserve an allocation set of uplink radio resources for specific ones of the users. The system uses a modification of the packet data channel (PDCH) of a GPRS/EGPRS or EDGE system which employs an Uplink Status Flag (USF) on each PDCH downlink radio block. The downlink reservation set information is commonly received by all users in the group of users. Allocation delay, bandwidth efficiency and other system parameters are optimized.

49 Claims, 7 Drawing Sheets

U.S. PATENT DOCUMENTS

| | | | |
|---|---|---|---|
| 5,168,502 A | 12/1992 | Millet | |
| 5,233,643 A | 8/1993 | Naeini et al. | |
| 5,239,677 A | 8/1993 | Jasinski | |
| 5,243,598 A | 9/1993 | Lee | |
| 5,293,380 A | 3/1994 | Kondo | |
| 5,299,198 A | 3/1994 | Kay et al. | |
| 5,363,376 A | 11/1994 | Chuang et al. | |
| 5,437,054 A | 7/1995 | Rappaport et al. | |
| 5,506,848 A | 4/1996 | Drakopoulos et al. | |
| 5,513,379 A | 4/1996 | Benveniste et al. | |
| 5,515,378 A | 5/1996 | Roy, III et al. | |
| 5,530,725 A | 6/1996 | Koch | |
| 5,533,028 A | 7/1996 | Hita de la Torre et al. | |
| 5,537,683 A | 7/1996 | Hill et al. | |
| 5,539,749 A | 7/1996 | Eul | |
| 5,548,806 A | 8/1996 | Yamaguchi et al. | |
| 5,625,877 A | 4/1997 | Dunn et al. | |
| 5,708,973 A | 1/1998 | Ritter | |
| 5,715,516 A | 2/1998 | Howard et al. | |
| 5,729,541 A * | 3/1998 | Hamalainen et al. | 370/337 |
| 5,740,526 A | 4/1998 | Bonta et al. | |
| 5,805,576 A | 9/1998 | Worley, III et al. | |
| 5,867,791 A | 2/1999 | Chambert | |
| 5,930,245 A | 7/1999 | Ishizuka et al. | |
| 6,112,058 A | 8/2000 | Walters et al. | |
| 6,137,784 A | 10/2000 | Wallerius et al. | |
| 6,192,038 B1 | 2/2001 | Wallerius et al. | |
| 6,266,330 B1 | 7/2001 | Jokinen et al. | |
| 6,349,094 B1 | 2/2002 | Vastano et al. | |
| 6,477,151 B1 | 11/2002 | Oksala | |
| 6,501,745 B1 * | 12/2002 | Turina et al. | 370/337 |
| 6,603,825 B1 | 8/2003 | Pecen | |
| 6,721,278 B1 | 4/2004 | Rimhagen et al. | |
| 6,791,944 B1 | 9/2004 | Demetrescu et al. | |
| 7,088,686 B1 * | 8/2006 | Radimirsch | 370/278 |
| 7,177,298 B2 * | 2/2007 | Chillariga et al. | 370/348 |
| 7,298,721 B2 * | 11/2007 | Atarashi et al. | 370/335 |
| 7,339,919 B2 * | 3/2008 | Harada | 370/347 |

FOREIGN PATENT DOCUMENTS

| | | |
|---|---|---|
| EP | 0673177 | 9/1995 |
| EP | 0689303 | 12/1995 |
| EP | 0702462 | 3/1996 |
| WO | WO 9100660 | 1/1991 |
| WO | WO 9312590 | 6/1993 |
| WO | WO 9314579 | 7/1993 |
| WO | WO 9426074 | 11/1994 |
| WO | WO 9427161 | 11/1994 |
| WO | WO 9623370 | 8/1996 |
| WO | WO 9715159 | 4/1997 |
| WO | WO 9740639 | 10/1997 |
| WO | WO 9836509 | 8/1998 |
| WO | WO 9854850 | 12/1998 |
| WO | WO 9963769 | 12/1999 |
| WO | WO 0115336 | 3/2001 |
| WO | WO 0150782 | 7/2001 |

OTHER PUBLICATIONS

Uehara et al., "A Dynamic Channel Assignment Method for Voise Packet Transmission Cellular System", Houston, TX, May 16-20, 1999, New York, NY: IEEE, US, vol. Conf. 49, May 16, 1999, pp. 2500-2504, XP00936262 ISBN: 0-7803-5566-0.

Crochiere et al., "Multirate Digital Signal Processing", Basic Principles of Sampling and Sampling Rate Conversion, Prentice-Hall, Inc. 1983, pp. 48-58.

Feher, K. Amilo, "Wireless Digital Communications, Modulation and Spread Spectrum Applicagtions", Prentice Hall PTR, pp. 43-44, New Jersey 1995.

Oppenheim et at, "Digital Signal Processing", Prentice-Hall, Inc., New Jersey, pp. 358-366.

Desplanches et al., "Complexity Reduction for a Multisensor Viterbi Equaliser", Electronic Letters, Jan. 18, 1996, vol. 32, No. 2, pp. 91-92.

Bottomley et al., "Adaptive Arrays and MLSE Equalization", Proceedings fo the 45th Vehicle Technology Conference, 1995, vol. 1, pp. 50-54.

Forney, David G., Jr., "Maximum-Likelihood Sequence Estimation of Digital Sequences in the Presence of Intersymbol Interference", IEEE Transactions on Information Theory, vol. IT-18, No. 3, May 1972, pp. 363-378.

Hagenauer at al., "A Viterbi Algorithm with Soft-Decision Outputs and its Applications", Proceedings of Globecom '89, No. 47, vol. 1, pp. 1680-1686, 1989.

Cox, Donald C., "Wireless Personal Communications: What Is It?", IEEE, Apr. 1995, pp. 20-35.

Yung, Wing-Po, "Probability of Bit Error for MPSK Modulation with Diversity Reception in Rayleigh Fading and Log-Normal Shadowing Channel", IEEE Trans. On Comm.., vol. 38, No. 7, 1990, pp. 933-937.

Jiang et al., "Channel Borrowing Without Locking for Sectorized Cellular Communications", IEEE Trans., 1994, VT-43, No. 4, pp. 1067-1077.

* cited by examiner

FIG.4 B048 NEW_PDCH

FIG.5 BURST NEW_PDCH

FIG.6 TIMING ADVANCE CHANNEL NEW_PDCH

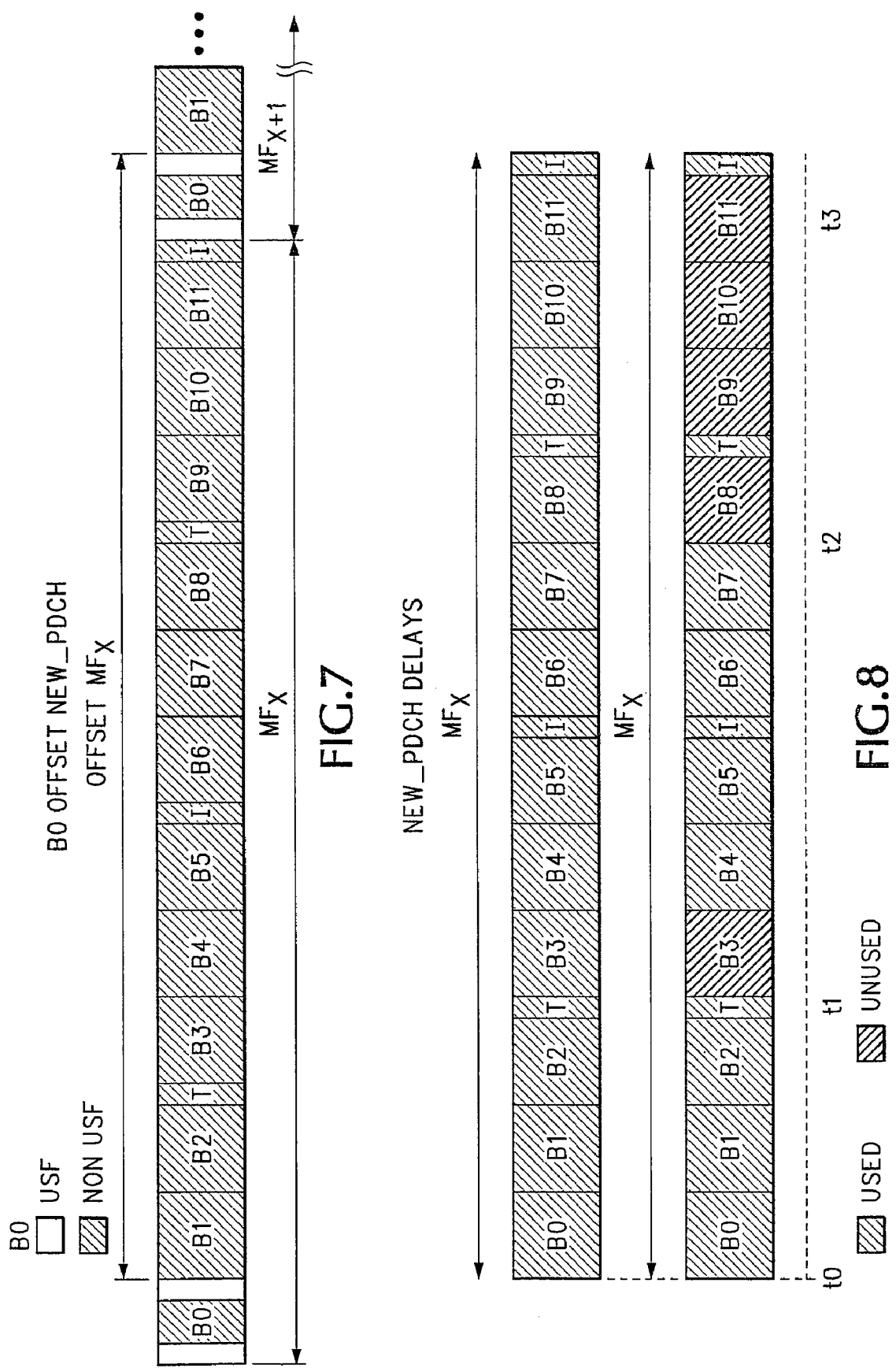

DYNAMIC CHANNEL ALLOCATION IN MULTIPLE-ACCESS COMMUNICATION SYSTEMS

CROSS-REFERENCE TO RELATED APPLICATION

This application is a continuation from U.S. patent application Ser. No. 09/753,182 filed Jan. 2, 2001, now U.S. Pat. No. 7,177,298 which claims the benefit of U.S. Provisional Patent Application Ser. No. 60/175,055 filed on Jan. 7, 2000, all of which are hereby incorporated herein by reference.

BACKGROUND OF THE INVENTION

The present invention relates to the field of two-way communication systems and more specifically to methods and apparatus for communication between communication units (CU) in a multiple access system. In particular embodiments, the invention relates to mobile telephone data users (cellular and personal communication systems), basic exchange telecommunications radio, wireless data communications, two-way paging and other wireless systems.

Conventional Cellular Systems. Current cellular mobile telephone systems developed due to a large demand for mobile services that could not be satisfied by earlier systems. Mobile telephone cellular systems based upon time division multiple access (TDMA) protocols "reuse" frequencies within a group of cells to provide wireless two-way radio frequency (RF) communication to large numbers of users. Each cell covers a small geographic area and collectively a group of adjacent cells covers a larger geographic region. Each cell has a fraction of the total amount of RF spectrum available to support cellular users. Cells are of different sizes (for example, macro-cell or micro-cell) and are generally fixed in capacity. The actual shapes and sizes of cells are complex functions of the terrain, the man-made environment, the quality of communication and the user capacity required. Cells are connected to each other via land lines or microwave links and to the public-switched telephone network (PSTN) through telephone switches that are adapted for mobile communication. The mobile networks provide for the hand-off of users from cell to cell and thus typically from frequency to frequency as mobile users move between cells.

In conventional cellular systems, each cell has a base station with RF transmitters and RF receivers co-sited for transmitting and receiving communications to and from cellular users in the cell. The base station employs forward RF frequency bands (carriers) to transmit forward channel communications to users and employs reverse RF carriers to receive reverse channel communications from users in the cell.

The forward and reverse channel communications use separate frequency bands so that simultaneous transmissions in both directions are possible. This operation is referred to as frequency division duplex (FDD) signaling. In time division duplex (TDD) signaling, the forward and reverse channels take turns using the same frequency band.

In addition to providing RF connectivity to users, the base station also provides connectivity to a Mobile Telephone Switching Office (MTSO). In a typical cellular system, one or more MTSO's are used over the covered region. Each MTSO can service a number of base stations and associated cells in the cellular system and supports switching operations for routing calls between other systems (such as the PSTN) and the cellular system or for routing calls within the cellular system.

Base stations are typically controlled from the MTSO by means of a Base Station Controller (BSC). The BSC assigns RF carriers to support calls, coordinates the handoff of mobile users between base stations, and monitors and reports on the status of base stations. The number of base stations controlled by a single MTSO depends upon the traffic at each base station, the cost of interconnection between the MTSO and the base stations, the topology of the service area and the switching capacity of the MTSO.

A handoff between base stations occurs, for example, when a mobile user travels from one cell to an adjacent cell. Handoffs are also performed to relieve the load on a base station that has exhausted its traffic-handling capacity or to improve a call undergoing poor quality communication. The handoff is a communication transfer for a particular user from the base station for the first cell to the base station for the second cell. During the handoff in conventional cellular systems, there may be a transfer period of time during which the forward and reverse communications to the mobile user are severed with the base station for the first cell and have not yet been established with the second cell.

Conventional cellular implementations employ one of several techniques to reuse RF bandwidth from cell to cell over the cellular domain. The power received from a radio signal diminishes rapidly as the distance between the transmitter and receiver increases. Conventional frequency reuse techniques rely upon this rapid fall-off in power as a function of distance. In a frequency division multiple access (FDMA) system, a communications channel consists of an assigned particular frequency and bandwidth (carrier) for continuous transmission. If a carrier is in use in a given cell, it can only be reused in cells sufficiently separated from the given cell such that the reuse site signals do not significantly interfere with the carrier in the original cell. The determination of how far away reuse sites must be and of what constitutes significant interference are implementation-specific details of specific cellular standards.

TDMA Conventional Cellular Architectures. In TDMA systems, time is divided into time slots of a specified duration. Time slots are grouped into frames, and the homologous time slots in each frame are assigned to the same user. It is common practice to refer to the set of homologous time slots over all frames as a time slot. Each logical channel is assigned a time slot or slots on a common carrier frequency. The radio transmissions carrying the user communications over each logical channel are thus discontinuous. The radio transmitter is off during the time slots not allocated to it.

Each separate radio transmission, which should occupy a single time slot, is called a burst. Each TDMA implementation defines one or more burst structures. Typically, there are at least two burst structures, one for the initial access and synchronization of a user to the system, and another one for routine communications once a user has been synchronized. Strict timing must be maintained in TDMA systems to prevent the bursts from one logical channel from overlapping and hence interfering with the bursts from other logical channels in the adjacent time slots.

Space Diversity. Space diversity is a method for improving signal quality by the use of multiple spaced-apart transmitting and receiving antennas to send forward channel signals or receive reverse channel signals from a single receiver/transmitter. On the forward link, signals from multiple spaced-apart transmit antennas are received by a single receiver. On the reverse link, multiple spaced-apart receiving antennas receive signals from a single transmitter. Micro-diversity is one form of space diversity that exists when the multiple transmitting or receiving antennas are located in close proximity to each other (within a distance of several meters for example). Micro-diversity is effective against Rayleigh or Rician fading. The terminology micro-diverse locations means, therefore, the locations of antennas that are close together and that are only separated enough to be effective against Rayleigh or Rician fading. The signal processing for micro-diverse locations can occur at a single physical location and micro-diversity processing need not adversely impact reverse channel backhaul bandwidth requirements.

Macro-diversity is another form of space diversity that exists when two or more transmitting or receiving antennas are located far apart from each other (at a distance much greater than several meters, for example, hundreds of meters or several kilometers). The terminology macro-diversity means that the antennas are far enough apart to have decorrelation at the receivers between the mean signal levels. In macro-diversity systems, on the forward channel the transmitted signals from the multiple transmitter antennas are received by the single receiver and processed to form an improved resultant signal at that single receiver. On the reverse channel, the received signals from the single transmitter are processed and combined to form an improved resultant signal from that single transmitter. On the forward channel, the decorrelation is between the mean signal levels for the multiple transmitted signals received by the single receiver. On the reverse channel, the decorrelation is between the mean signal levels for the multiple received signals from the single transmitter. On the reverse link, since macro-diversity processing involves forwarding of signals to a common processing location, an adverse impact on backhaul channel bandwidth tends to result from macro-diversity processing.

In the cross-referenced application, a cellular system is shown having a zone manager that broadcasts forward channel (FC) communications from a broadcaster to multiple users located within a zone. The broadcaster, in the embodiment described, is distributed to include distributed broadcaster transmitters and a broadcaster control 14. The broadcaster transmitters are sited at macro-diverse locations relative to each other within the zone. One or more of the broadcaster transmitters broadcasts in a forward channel (FC) to each of the users. The broadcaster control includes a broadcaster signal processor receiving control signals and operating to control the signals that are broadcast on each of the broadcaster transmitters. The control signals are derived from the reverse channel signals from collectors. Each of the multiple users transmits reverse channel (RC) communications to one or more of multiple collectors, which in turn forward the reverse channel communications to an aggregator in the zone manager. The aggregator in turn provides the control signals to the broadcaster control for signal processing to assist the broadcaster control to select and control the forward channel signals.

In the cross-referenced application, each of the users has a receiver antenna for receiving broadcasts on the forward channel from one or more of the broadcaster transmitters of the broadcaster. Also, each of the users has a transmitter that transmits on a reverse channel to the collectors. The collectors are sited at macro-diverse locations relative to each other within the zone. Therefore, multiple copies of macro-diverse reverse channel communications are received at the aggregator for each user.

In the cross-referenced application, a typical user, U1, has forward channel (FC) communications ($^{bc/bt}$FC) from the broadcaster control to each of the broadcaster transmitters and forward channel communications ($^{bt/u}$FC) from each of the broadcaster transmitters to user U1. The user U1 has user-to-collector reverse channel communications ($^{u/c}$RC) to each of the collectors, and the collector-to-aggregator reverse channel communications ($^{c/a}$RC) for each of the collectors to aggregator 17.

The forward and reverse channel communications of the cross-referenced system apply to any digital radio signal system including for example TDMA, CDMA, SDMA and FDMA systems. If the digital radio signals of any particular system are not inherently burst structured, then arbitrary burst partitions may be used for confidence metric processing.

Shadow Fading. The decorrelation of mean signal levels employed in macro-diversity systems is due to local variability in the value of signal strength diminution between the single receiver/transmitter and the spaced apart transmitting and receiving antennas. This local variability exists on length scales above Rayleigh or Rician fading and is due to terrain effects, signal blocking by structures or vegetation, and any other variability that exists in a particular environment. This variability is referred to as shadow fading. Decorrelation lengths for shadow fading may be as small as length scales just above Rayleigh fading length scales (for example, less than a few meters), or may be as large as several kilometers.

Channel Allocation. Many communications systems multiplex multiple users on a data channel in order to increase system efficiency. In such systems, a common control channel is often required to maintain allocations of the users sharing that resource. The control channel must be detected and analyzed by all the users sharing a resource. This control channel is often embedded in the data channel itself In addition, since mobile systems operate in very harsh radio environments, extensive measures are taken to enhance the performance of the radio link between the base station and the users. Many of these techniques require the optimization of the downlink for a specific user, at the expense of other users. An example of such a technique is downlink power control. Unfortunately, when a downlink channel is optimized for one user, the other users wishing to detect the control information, embedded in the data channel, quite possibly cannot detect it. This operation can result in detrimental consequences such as missed allocations, thereby reducing capacity.

A number of the downlink optimization techniques suffer from these harmful consequences, for example, packet data based GPRS/EGPRS or EDGE systems. Such systems have been developed to coexist with GSM systems which are the most widely deployed digital mobile communication systems in the world.

In multiple access communication systems, a shared resource, which is typically a communication channel, must be assigned to a specific communication unit (CU) for a specific duration in order to use the resource efficiently. Moreover, the assignment of the resource must be known to all other potential users of the resource in order to eliminate the possibility of multiple CU's colliding on that channel. The channel allocation procedure used to perform this assignment must usually meet certain significant performance requirements such as minimal assignment delay, efficient usage of the channel and quick response to changing channel conditions while incurring the least overhead in terms of inter-CU signaling.

Fixed allocation of channels eliminates contention for channels by assigning the channel usage to a specific CU. All other CU's receive similar assignments and are prohibited from accessing the channel when it is not assigned to them. Another approach to addressing the problem is by use of dynamic channel allocation where all CU's are required to monitor a common channel, referred to as an allocation block or allocation channel, which contains the assignment of the channel until the next instance of the allocation block. Dynamic channel allocation permits better utilization of the channel than fixed allocation since channel assignment can be varied continuously depending on the offered load and the channel conditions.

In a wireless system (such as GPRS/EGPRS or EDGE), the channel properties can change dramatically over short periods of time and hence the ability to control and assign channels dynamically can significantly improve channel utilization.

In a GPRS/EGPRS or EDGE system, dynamic channel allocation is performed by transmitting a Uplink Status Flag (USF) on each downlink radio block. This USF is used to reserve a set of one or more subsequent uplink radio block(s) for a specific user (mobile station or MS) from among a set of MS's sharing the uplink packet data channel (PDCH).

Downlink Power Control. The downlink radio block carrying the USF may be destined for an MS (for example, MS-A) different from the MS (for example, MS-B) for which the USF is targeted. In this scenario, down link power control must be performed in such a way that the radio block can be decoded properly by the MS-A as well as MS-B. This results in potentially severe restrictions on the power control algorithm.

Fast Macro-Diverse Switching (FMS). The use of downlink macrodiversity (MD) in an FMS system results in a similar problem which manifests when a remote transmit (TX) resource is being used to transmit a radio block (for MS-A) containing a USF intended for MS-B (which might be best served from a local TX). The problem then is one of ensuring that MS-B is able to properly receive and decode the USF on a radio block for MS-A. This problem can place severe restrictions on selection of the best TX resource for FMS.

Smart Antennas. The use of antenna arrays with beams directed towards specific regions within a cell causes the same problem as described for FMS systems. Since smart antenna systems rely on finding the best beam or antenna for the intended receiving MS (MS-A), MS-B may not be able to receive and decode the USF properly unless MS-B happens to be located within the region covered by the beam/antenna used for MS-A. Consequently, either depending on the relative positions of MS-A and MS-B, a wider beam must be used nullifying the benefits or severely impairing the efficacy of the smart antenna system, or the choice of MS's that can share the uplink resource must be severely restricted.

In accordance with the above background, the communications problems resulting from interference, noise, fading and other disturbances create a need for improved wireless communication systems which overcome the interference problems and other limitations of conventional cellular systems.

SUMMARY

The present invention is a method and apparatus for dynamic allocation of communication channels among communication units (CU) in a communications system. The communications system has multiple access channels, access mode control and a channel allocator for allocating communication units to channels in a network. Dynamic channel allocation employs a reservation set for reserving channels for the communication units and an allocation set corresponding to the reservation set for receiving channels allocated to the communication units. The reservation set and the allocation set are changed dynamically as a function of network parameters to control system performance. Reservation set information is broadcast downlink to multiple users to reserve an allocation set of uplink radio resources for specific ones of the users.

The system in a number of embodiments uses a modification of the packet data channel (PDCH) of a GPRS/EGPRS or EDGE system which employs an Uplink Status Flag (USF) on each PDCH downlink radio block. The downlink reservation set information is commonly received by all users in the group of users. Allocation delay, bandwidth efficiency and other system parameters are optimized in different embodiments.

A number of new PDCH multi-frame structures, NEW_PDCH, are available for transmitting reservation set and allocation set information for multiple communication units that share the same channel. The NEW_PDCH structures are dynamically and selectively used in response to traffic demand with the objective of maximizing network spectrum efficiency.

In a B0 embodiment of the NEW_PDCH, reservation set information is transmitted only in the downlink PDCH block (B0). The B0 block is a reservation block or reservation set that reserves a set of blocks, namely, reserves twelve uplink radio blocks which are identified as the allocation set or allocation frame. Since only the first block, B0, of the NEW_PDCH carries uplink allocation information, the bandwidth available from the other blocks is freed for other usage in some embodiments, the block B0 is operated in a 'broadcast' (or more appropriately 'multicast') mode while all the other blocks are optimized, for example with lower power transmission, for specific users. Preferably, block B0 is GMSK modulated to allow both MSs that operate with a GPRS protocol and MSs that operate with an EGPRS protocol to decode block B0.

The present invention relates to wireless communication media, such as a cellular mobile or fixed wireless communication systems and the principles described apply to wireline environments as well. In different embodiments, dynamic allocation is employed for mobile telephone data users (cellular and personal communication systems), basic exchange telecommunications radio, wireless data communications, two-way paging and other wireless and wireline systems.

BRIEF DESCRIPTION OF THE DRAWINGS

FIG. 4 depicts a B048 embodiment of a NEW_PDCH where three blocks (0, 4 and 8) transmit the reservation information in a multi-frame.

FIG. 5 depicts a burst embodiment of a NEW_PDCH where a set of downlink bursts are distributed across the multi-frame to transmit the reservation information in a multi-frame.

FIG. 6 depicts a timing advance channel of a NEW_PDCH where the two bursts in each multi-frame reserved for the continuous timing advance procedure are modified to include reservation information.

FIG. 7 depicts a representation of a variant of the B0 embodiment that shifts the B0 block with reservation information in one multiframe, $MF_X$, to the next multiframe, $MF_{X+1}$.

FIG. 8 depicts a representation of a fully allocated NEW_PDCH and an NEW_PDCH with cavities.

DETAILED DESCRIPTION

Figure 1:
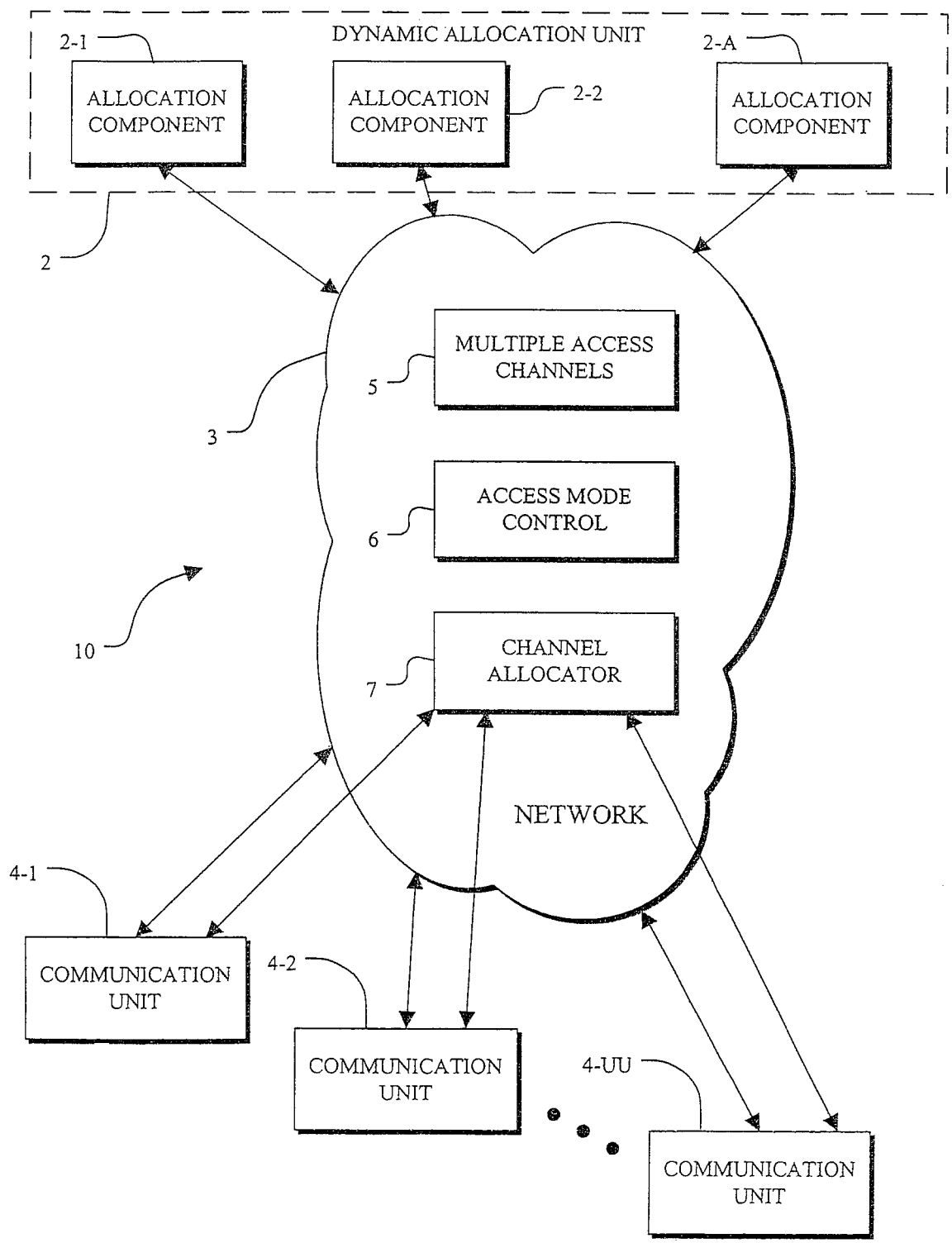
FIG. 1 depicts a multiple access communication system interconnecting a number of communication units where the allocation of channels is dynamically controlled by a dynamic channel allocation unit.

Multiple Access System With Dynamic Channel Allocation—FIG. 1. In FIG. 1, a communication system 10 is shown for interconnecting a plurality of communication units (CU) 4, including communication units 4-1, 4-2, . . . , 4-C, over a communication network 3. The network 3 has multiple access channels 5 that are capable of operation in different access modes under the control of access mode control 6. As a function of the access mode and the availability of channels, channel assignments for the communication units 4 are made by a channel allocator 7. In order to make use of unused times for otherwise assigned time slots, two or more communication units are assigned at different times to the same time slot and the usage is switched among the sharing communication units. With such sharing, what would be unused cavities for one particular communication unit are used by another communication unit. The operation of the channel allocator is under control of the dynamic allocation unit 2 which includes allocation components 2-1, 2-2, . . . , 2-A that can be either centralized or distributed through out the system 10.

In one embodiment of the dynamic allocation unit 2, dynamic channel allocation information is communicated to the CUs by the allocation unit to indicate availability of a channel for a specific CU. In certain other embodiments, dynamic channel allocation is achieved by contention detection and retransmission by CUs.

In another embodiment of the dynamic allocation unit 2, dynamic channel allocation is achieved by having the allocation unit provide the channel assignments to CUs independent of the data communication channel used by the CUs.

Figure 2:
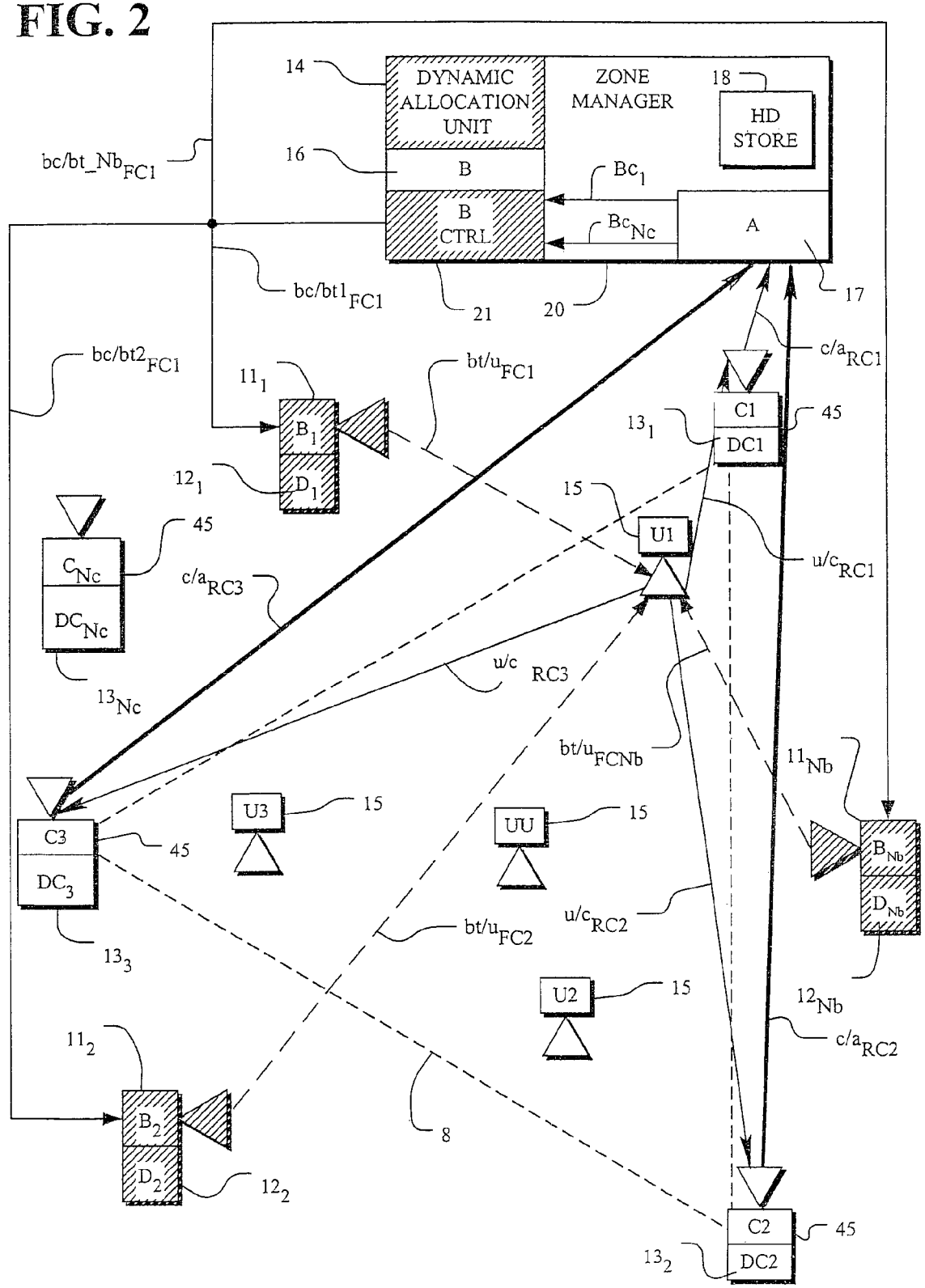
FIG. 2 depicts a communication system for wireless users employing macro-diversity combining and dynamic channel allocation.

Two-way Multiple Access Communication System—FIG. 2. FIG. 2 shows an embodiment of the FIG. 1 system in which a two-way wireless multiple access communication system employing macro and micro diversity uses dynamic channel allocation.

In FIG. 2, the cellular system has a zone manager 20 that broadcasts forward channel (FC) communications from broadcaster 16 to multiple users 15 including users U1, U2, . . . , UU located within a zone 8 designated by the dashed-line triangle. The users 15 are examples of the communication units 4 of FIG. 1. The broadcaster 16, in the embodiment described, is distributed to include distributed broadcaster transmitters $11_1, 11_2, \ldots, 11_{Nb}$ and a broadcaster control 21. The broadcaster transmitters $11_1, 11_2, \ldots, 11_{Nb}$ are sited at macro-diverse locations relative to each other within zone 5. One or more of the broadcaster transmitters $11_1, 11_2, \ldots, 11_{Nb}$ broadcasts in a forward channel (FC) to each of the users 15. The broadcaster control 21 includes a broadcaster signal processor receiving control signals and operating to control the signals that are broadcast on each of the broadcaster transmitters $11_1, 11_2, \ldots, 11_{Nb}$. The control signals in one embodiment are $Bc_1, \ldots, Bc_{Nc}$ and are derived from the reverse channel signals from the $C1, C2, C3, \ldots, C_{Nc}$ collectors 45 of FIG. 2. Each of the multiple users 15 transmits reverse channel (RC) communications to one or more of multiple collectors 45 including collectors C1, C2 and C3, which in turn forward the reverse channel communications to aggregator 17 in zone manager 20. The aggregator 17 in turn provides the control signals Bc, $BC_{Nc}$ to the broadcaster control 21 for signal processing to assist the broadcaster control 21 to select and control the forward channel signals.

Each of the users 15 has a receiver antenna for receiving broadcasts on the forward channel from one or more of the broadcaster transmitters $11_1, 11_2, \ldots, 11_{Nc}$ of the broadcaster 16. Also, each of the users 15 has a transmitter that transmits on a reverse channel to the collectors 45. The collectors 45 are sited at macro-diverse locations relative to each other within zone 5. Therefore, multiple copies of macro-diverse reverse channel communications are received at the aggregator 17 for each user.

In FIG. 2, the U1 user 15 is typical with forward channel (FC) communications ($^{bc/bt}FC$) from the broadcaster control 21 to each of the broadcaster transmitters $11_1, 11_2, \ldots, 11_{Nb}$, and forward channel communications ($^{bt/u}FC$) from each of the broadcaster transmitters $11_1, 11_2, \ldots, 11_{Nb}$ to user U1. The forward channel communications to the U1 user 15 include the broadcaster control-to-broadcaster transmitter communication $^{bc/bt}FC1$, the broadcaster control-to-broadcaster transmitter communication $^{bc/bt}FC2$, the broadcaster control-to-broadcaster transmitter communication $^{bc/bt}FCNb$, the broadcaster transmitter-to-user communication $^{bt/u}FC1$, the broadcaster transmitter-to-user communication $^{bt/u}FC2$, and the broadcaster transmitter-to-user communication $^{bt/u}FCNb$. The user U1 has user-to-collector reverse channel communications $^{u/c}RC$) to each of the C1, C2 and C3 collectors 45, and the collector-to-aggregator reverse channel communications ($^{c/a}RC$) for each of the collectors to aggregator 17. The reverse channel communications from the U1 user 15 include the user-to-collector communication $^{u/c}RC1$ and the collector-to-aggregator communication $^{u/a}RC1$, the user-to-collector communication $^{u/c}RC2$ and the collector-to-aggregator communication $^{u/a}RC2$ and the user-to-collector communication $^{u/c}RC3$ and the collector-to-aggregator communication $^{u/a}RC3$. Each of the other users U2, . . . , UU in FIG. 2 has similar forward and reverse channel communications.

The forward and reverse channel communications of FIG. 2 in the present invention apply to any digital radio signal system including for example TDMA, CDMA, SDMA and FDMA systems. If the digital radio signals of any particular system are not inherently burst structured, then arbitrary burst partitions may be used.

In FIG. 2, the dynamic channel allocation is implemented in the dynamic allocation unit 14 and/or in the multiple distributed dynamic allocation components $12_1, 12_2, \ldots, 12_{Nb}$ located at broadcasters $11_1, 11_2, \ldots, 11_{Nb}$ and/or multiple distributed dynamic allocation components $13_1, 13_2, \ldots, 13_{Nb}$ located at collectors $45_1, 45_2, \ldots, 45_{Nc}$.

The FIG. 2 system performs dynamic channel allocation by transmitting downlink reservation set information from the multiple broadcasters $11_1, 11_2, \ldots, 11_{Nb}$ using the broadcaster transmitter-to-user communication $^{bt/u}FC1$, the broadcaster transmitter-to-user communication $^{bt/u}FC2$, and so on including the broadcaster transmitter-to-user communication $^{bt/u}FCNb$. The downlink reservation set information is broadcast to and shared among multiple users 15. The downlink reservation set information reserves an allocation set of uplink radio resources for specific users from among the users 15. The locations and sizes of reservation set information and allocation set information within the messaging protocol in use is important for efficient operation. In order to manage the dynamic channel allocation for efficient operation, the allocation set size is limited to a predetermined value and the reservation set size need be no larger than is adequate to identify the allocation set of uplink radio resources. The sizes of allocation sets and reservation sets are important because they are transmitted over the air interface where bandwidth is limited.

The FIG. 2 system is, for purposes of the present explanation, a GPRS/EGPRS or EDGE system in which dynamic channel allocation is performed by transmitting the reservation set as a 3-bit Uplink Status Flag (USF) on each PDCH downlink radio block of the multiple broadcasters $11_1$, $11_2, \ldots, 11_{Nb}$. The USF is used to reserve the allocation set of radio resources which, in the example, is an uplink set of radio block(s) for specific users, from among the group of users 15, sharing an uplink packet data channel (PDCH). The presence of the USF information within radio blocks, if not properly managed, places limitations on network operations and the ability to be compatible with future systems. These limitations are minimized or eliminated by using clearly-identified, common downlink resources to distribute the USF reservation set information for a predetermined allocation set of uplink radio resources. Each downlink reservation set includes one or more radio blocks optimized for a single user. The downlink USF reservation set information is commonly received by all users in the group of users and sharing requirements among the group of users only apply to the downlink common resource.

In examples described, the allocation set of resources is a group of uplink radio blocks restricted to those comprising a single PDCH multi-frame of 12 radio blocks of a standard GPRS/EGPRS or EDGE protocol.

Hereinafter, a number of new PDCH multi-frame structures, NEW_PDCH, are described for transmitting USF reservation set and allocation set information for multiple MS users that share the same channel. In any operating network, no single one of these NEW_PDCH structures is used at all times and for all time slots. These structures are dynamically and selectively used in response to traffic demand with the objective of maximizing network spectrum efficiency. To provide backward compatibility, networks are implemented allowing concurrent allocation of time slots (TSs) using both the NEW_PDCH and the standard PDCH since existing MS users cannot use a NEW_PDCH.

Figure 3:
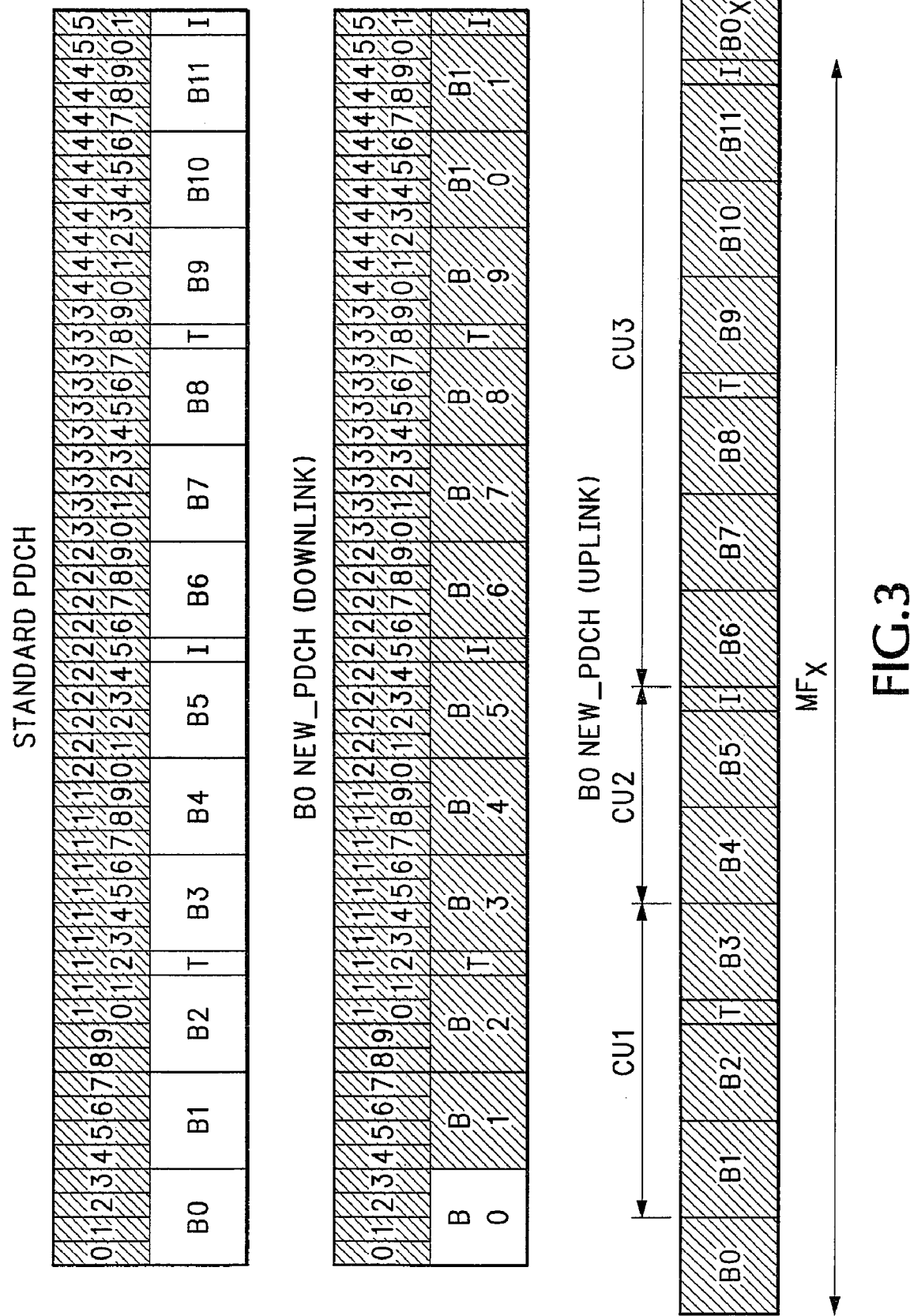
FIG. 3 depicts a representation of the blocks of a multi-frame format of a standard PDCH positioned above the multi-frame format of a B0 embodiment of a NEW_PDCH where a single radio block (B0) located at the beginning of a multi-frame transmits the reservation information.

B0 Embodiment—FIG. 3. In the top diagram of FIG. 3, a multi-frame format of a standard PDCH for a GPRS/EGPRS or EDGE system is shown where all blocks, B0-B11, are allocated with USF bits for identifying the uplink information. In the middle diagram of FIG. 3, a multi-frame format of a downlink NEW_PDCH is shown where the USF reservation set information is transmitted in one entire downlink PDCH block (B0). In both the top and middle diagrams of FIG. 3, the blocks allocated as available for carrying reservation set information are clear and not shaded. In the bottom diagram of FIG. 3, a multi-frame format of an uplink NEW_PDCH is shown where the allocation set is indicated, by way of example, with the uplink blocks B1, B2 and B3 allocated to CU1, with the uplink blocks B4 and B5 allocated to CU2 and with the uplink blocks B6, B7, ..., B11 allocated to CU3. The uplink block B0 logically can be allocated (for example, to CU1) but the delay in receiving and decoding the allocation information in time for the uplink transmission of B0 in the same multiframe, $MF_x$, is impractical. Accordingly, $B0_{x+1}$, of the next multiframe, $MF_{x+1}$, can be ALLOCATED TO CU3 and employed with an offset as hereinafter discussed in connection with FIG. 7.

For the NEW_PDCH in the middle diagram of FIG. 3, the B0 block is a reservation block or reservation set that reserves a set of blocks, namely, reserves twelve uplink radio blocks which are identified as the allocation set or allocation frame. Reservation block B0 occurs in each downlink multi-frame of each NEW_PDCH. Since only the first block, B0, of the NEW_PDCH carries uplink allocation information and the USF information is not transmitted in any of the other radio blocks B11, ..., B11 of the downlink multiframe, the bandwidth available to be provided by those other blocks is freed for other usage. Further, downlink block B0 can be operated in a 'broadcast' (or more appropriately 'multicast') mode while all the other downlink blocks B1 ..., B11 can be optimized, for example with lower power transmission, for specific users. Preferably, block B0 is GMSK modulated to allow both MSs that operate with a GPRS protocol and MSs that operate with an EGPRS protocol to decode block B0. Hence GPRS/EGPRS properties related to USF decoding are eliminated.

In the NEW_PDCH embodiment of FIG. 3, each MS communication unit need only monitor the first block of each downlink multi-frame to determine its allocation for the allocation frame. While the NEW_PDCH embodiment of FIG. 3 provides the required USF information, initial allocation delays, bandwidth efficiency and potential changes in the GPRS/EGPRS or EDGE specifications need to be considered. Using the NEW_PDCH of FIG. 3, initial allocation delays can vary from 20 msec (one radio block) to 240 msec (one multi-frame). Other NEW_PDCH embodiments are discussed hereinafter which minimize the initial allocation delay.

By way of summary in FIG. 3, the middle diagram is a B0 embodiment of NEW_PDCH channels that have multiframes of sequential radio blocks denominated B0, B1, B11 wherein downlink block B0 is a one block reservation set and the bottom diagram is a B0 embodiment of uplink blocks B1, ..., B11, $B0_{x+1}$ are a twelve block allocation set. The B0 embodiment has several important characteristics as follows.

Bandwidth Efficiency. The available bandwidth by redistributing the reservation set USF bits does not change over the entire multi-frame. A standard radio block has 12 of 456 (GPRS) or 36 of 1368(EGPRS) bits allocated for USF (2.6% per block). This allocation implies that if all the USF bits resided within B0 (in the B0 embodiment), 144 of 456(GPRS) or 432 of 1368(EGPRS) bits are reserved for the USF in B0 (that is, 31.6% of B0). This allocation leaves approximately 68.4% of B0 to be allocated for other purposes. Note that all other blocks (that is, blocks B1 through B11) are no longer required to carry USF information. Either way, a total of 2.6% of bits over the multi-frame are allocated for USF information.

Channel Coding and Power Level. B0 is transmitted at a power level ensuring that all relevant MS communication units (users) can receive and decode it correctly. Transmit power for the other downlink blocks can be adjusted according to a power control algorithm to reduce interference. In standard GPRS/EGPRS or EDGE, the network transmits each block at a power level so that the intended MS users can detect it. Block B0 in the NEW_PDCH is transmitted at a power level so that all the MS users sharing the NEW_PDCH can receive and decode it correctly. This higher power implies a higher interference level due to B0 and is of concern if B0 overlaps an interfering sites' non-B0 block. A revolving allocation block method, where the allocation block carrying the USF information changes location and is correlated with a deterministic number of blocks in an allocation frame, is used in one embodiment to spread interference to the USF information across blocks. An alternative operation is to stagger frame numbers at interfering sites and this operation works well when the number of interfering cells is high.

Figures 4, 5, 6:
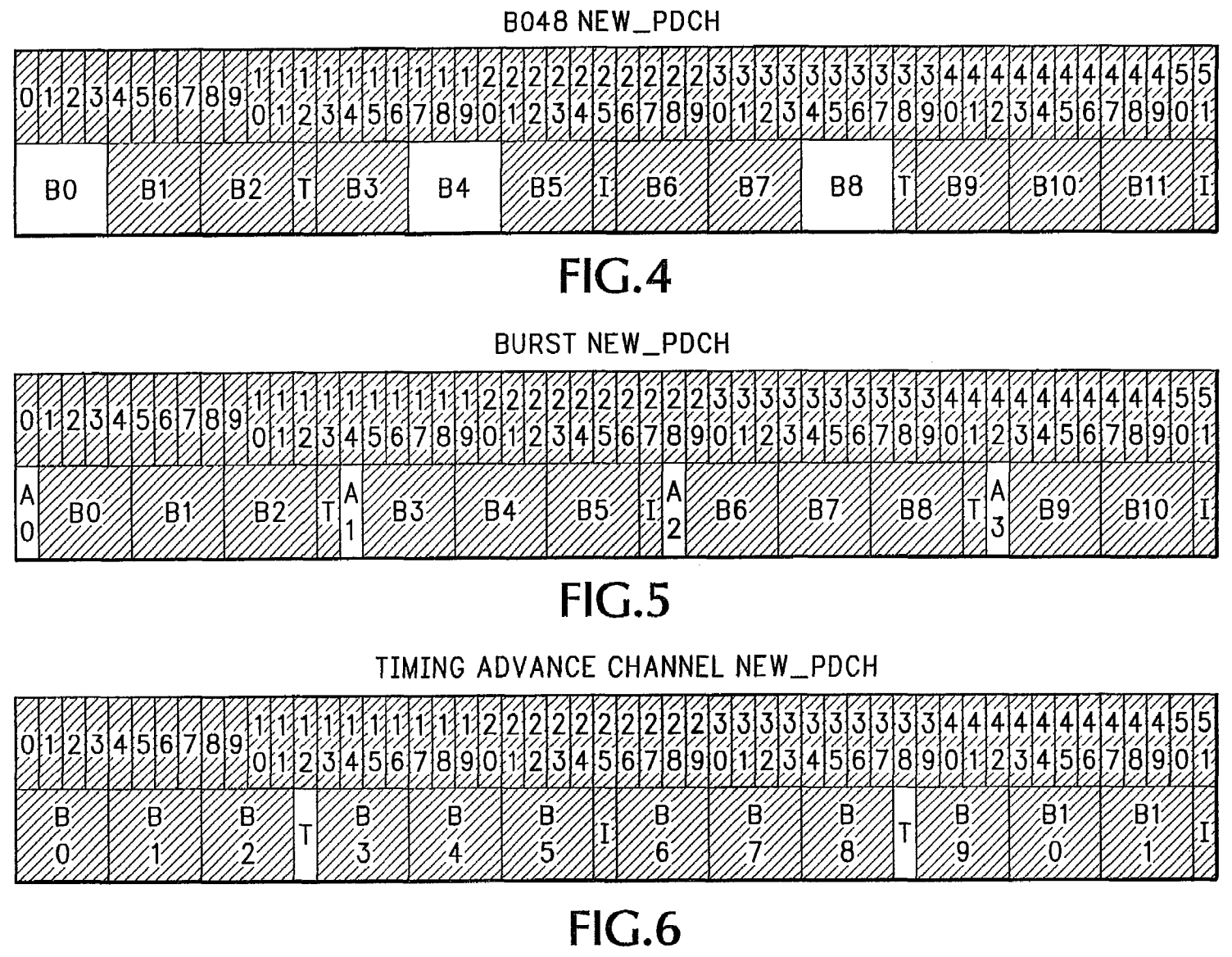

B048 Embodiment—FIG. 4. The FIG. 4 embodiment is a variation of the B0 embodiment of FIG. 3 where instead of reserving a single radio block (B0) in the beginning of a multi-frame, three blocks are reserved in a downlink multi-frame. In FIG. 4, the three blocks, B0, B4 and B8 are a reservation set that provide USF reservation information for each set of the four subsequent blocks, respectively, in the multi-frame. Each MS user must monitor these three blocks in the downlink multi-frame in order to determine its allocation in the uplink multiframe. The properties such as bandwidth efficiency and changes in the GPRS/EGPRS or EDGE specifications are similar to those of the B0 embodiment of FIG. 3.

The FIG. 4 embodiment partially addresses the initial allocation delay property of the B0 embodiment. Initial allocation delay can vary from 20 msec (for one radio block) to 80 msec (for four radio blocks). Since each of the blocks (B0, B4 and B8) specifies the uplink allocation for the next four radio blocks, the USF granularity of 1 (that is, four radio blocks) is easily accommodated. B0, B4 and B8 are GMSK modulated to allow MSs with both GPRS and EGPRS protocols to decode it, hence GPRS/EGPRS MS user issues related to USF decoding are eliminated. A B06 embodiment (blocks B0 and B6 carrying USF information) is another variant of the B0 embodiment of FIG. 3.

Allocation Burst Embodiment—FIG. 5. The FIG. 5 embodiment reserves a set of reservation bursts distributed across the downlink multi-frame for USF transmission. Each reserved burst contains USF information for the set of radio blocks following the burst up to the next such reservation burst. In FIG. 5, four such bursts (bursts 0, 14, 28 and 42) are reserved and each burst carries uplink reservation information for a maximum of three radio blocks. Since the information is contained within single bursts instead of being interleaved across four bursts, USF decoding robustness at the MS user becomes an issue, perhaps justifying the use of a new more robust coding scheme.

The FIG. 5 embodiment operates using the NEW_PDCH channels that have multiframes of sequential radio bursts denominated b0, b1, b2, . . . , b51. The embodiment uses a reservation set of downlink bursts b0, b14, b28 and b42 and an allocation set in the uplink bursts that includes a first uplink burst group b1, b2, . . . , b12 and b14, a second uplink burst group b15, b16, . . . , b26 and b28, a third uplink burst group b29, b30, . . . , b40 and b42 and a fourth uplink burst group b43, b44, . . . , b50 and b0 (not shown) of a following multiframe where downlink burst b0 allocates for the first uplink burst group, burst b14 allocates for the second uplink burst group, burst b28 allocates for the third uplink burst group and burst b42 allocates for the fourth uplink burst group.

In the Burst NEW_PDCH embodiment of FIG. 5, the penalty for a failure of a communication unit to detect and use a reserved burst is three unused uplink radio blocks that were allocated to the communication unit.

Use of a Standard Common Control Channel. In this embodiment, the USF requirement is addressed by moving all the USF information on to a common control channel (BCCH or some other TBD CCCH). This common control channel contains all the USF allocations. Each MS user is required to monitor this CCCH in order to obtain its uplink allocation. With this common monitoring requirement, some MS users monitor a CCCH on a different carrier or time slot (TS) than are used for the assigned PDCHs for those users.

Power Control on USF Bits. When the base station can perform power control on particular bursts independently of power control on other of the bursts, such capability can be advantageously used in connection with USF transmissions. Frequently such capability exists for the bursts of a training sequence (TSC). In operation, the power level is set high for the USF bursts, like it is set for TSC bursts, so that the targeted MS users can decode the USF bursts correctly. In such operation, power amplifiers must permit power control at a bit-level granularity. This operation is particularly useful when USF bits are consecutive and such a feature may be provided for in future versions of the GPRS/EGPRS or EDGE specifications.

Zoning with MS groups. This embodiment does not change the GPRS/EGPRS or EDGE specification. This embodiment requires the base station to identify users which lie in a "hearing zone", more particularly, users that can share a PDCH without encountering any problem in decoding USF's on radio blocks destined for any MS within that hearing zone. The grouping may be performed based on a notion of the MS location derived from power level, timing advance, triangulation or other methods.

An FMS system can group MS users into a macrodiversity (MD) zone and a non-MD zone. A smart resource allocation scheme assigns or reassigns PDCH resources such that the MS users within each zone do not encounter any USF decoding issues. Potential problems with bandwidth or resource utilization efficiency blocking and consequent capacity losses are addressed in this embodiment.

Timing Advance Channel NEW_PDCH-FIG. 6. In the FIG. 6 embodiment, two bursts (12, 38) in each downlink multi-frame reserved for the continuous timing advance procedure are modified also to include USF information for that multi-frame (or four bursts for two multi-frames).

B0 Offset NEW_PDCH—FIG. 7. In FIG. 7, the B0 embodiment of FIG. 3 is modified by logically shifting the B0 block with USF information in one multiframe, $MF_x$, to the next multiframe, $MF_{X+1}$. An allocation frame includes blocks B1-B11 of the current multiframe, $MF_X$, as well as block B0 of the next multiframe, $MF_{X+1}$, so that the allocation blocks are B1-B11, B0. The logical shift of the B0 embodiment of FIG. 3 as indicated in FIG. 7 can be applied to any of the other embodiments and the shift can be for on any one or more blocks or other increments (such as bursts). The FIG. 7 embodiment also makes more efficient use of the bits in the downlink B0 block when the USF bits do not fully occupy the block. The spare bits can be assigned to downlink data for MS users. The USF data in block B0 is indicated as clear with no shading while the portions of block B0 that are used for other data are shaded.

Delays—FIG. 8. FIG. 8 illustrates a fully allocated uplink NEW_PDCH in the top diagram and an uplink NEW_PDCH with cavities in the lower diagram. In standard GPRS/EGPRS or EDGE protocols, USF assignments are made on a per block basis. An MS user requesting an uplink channel assignment using a standard PDCH can be granted the next available uplink radio block.

In a NEW_PDCH, USF assignments are made early and on a multiframe basis. In FIG. 8, assignments are made in reservation block B0 of the downlink NEW_PDCH. When all radio blocks of the allocation set are allocated in B0 of a multiframe $MF_x$, then a new uplink channel request from a user must wait for the allocation block B0 in the next multiframe $MF_{x+1}$. This operation can result in an initial allocation delay of up to 240 msec, that is, a delay until the next multi-frame, $MF_{x+1}$.

The embodiment described in connection with the lower diagram of FIG. 8 aims at reducing this initial allocation delay associated with a NEW_PDCH. Under less than fully-loaded traffic conditions, not all uplink PDCH blocks are occupied. Such unoccupied blocks are called cavities. The existence of cavities can be used to reduce the allocation delay for new requests from MS users. In connection with the cavities of FIG. 8, an adaptive and smart resource allocation unit as part of the dynamic allocation unit 14 in FIG. 2 uses a pseudo-dynamic allocation method to utilize these cavities to reduce initial allocation delay.

In FIG. 8, uplink blocks B3, B8, . . . , B11 are cavities. A new user request for uplink allocations at time t1, may be able to use any of the B3, B8, . . . , B11 cavities. Similarly, a new user request for uplink allocations at time t3, may be able to use any of the B8, . . . , B11 cavities. A new users request after t3, must wait until the next multiframe, $MF_{x+1}$. Assignments for these cavities in this embodiment are made during the channel allocation process of GPRS/EGPRS and EDGE using either the broadcast channel or the downlink dedicated control channel which is transported on a PDCH, such as occur at the time of the shaded B1 or B2 blocks in FIG. 8. This operation of assigning new requests from users applies only to new MS user requests during their first multi-frame assignment to a shared channel during $MF_x$. On the second multi-frame, $MF_{x+1}$, these users are served along with the other users sharing the channel, that is, via the USF allocation in the B0 block of $MF_{x+1}$.

Smart Resource Allocation & Scheduling. Resource allocation and scheduling methods are employed to improve performance. The complexity of these methods increases depending on traffic load, bandwidth requirements and initial allocation delay requirements sensed by components in the dynamic allocation unit 14 of FIG. 2. In the examples described, all time slots are configured as NEW_PDCH's.

Figure 9:
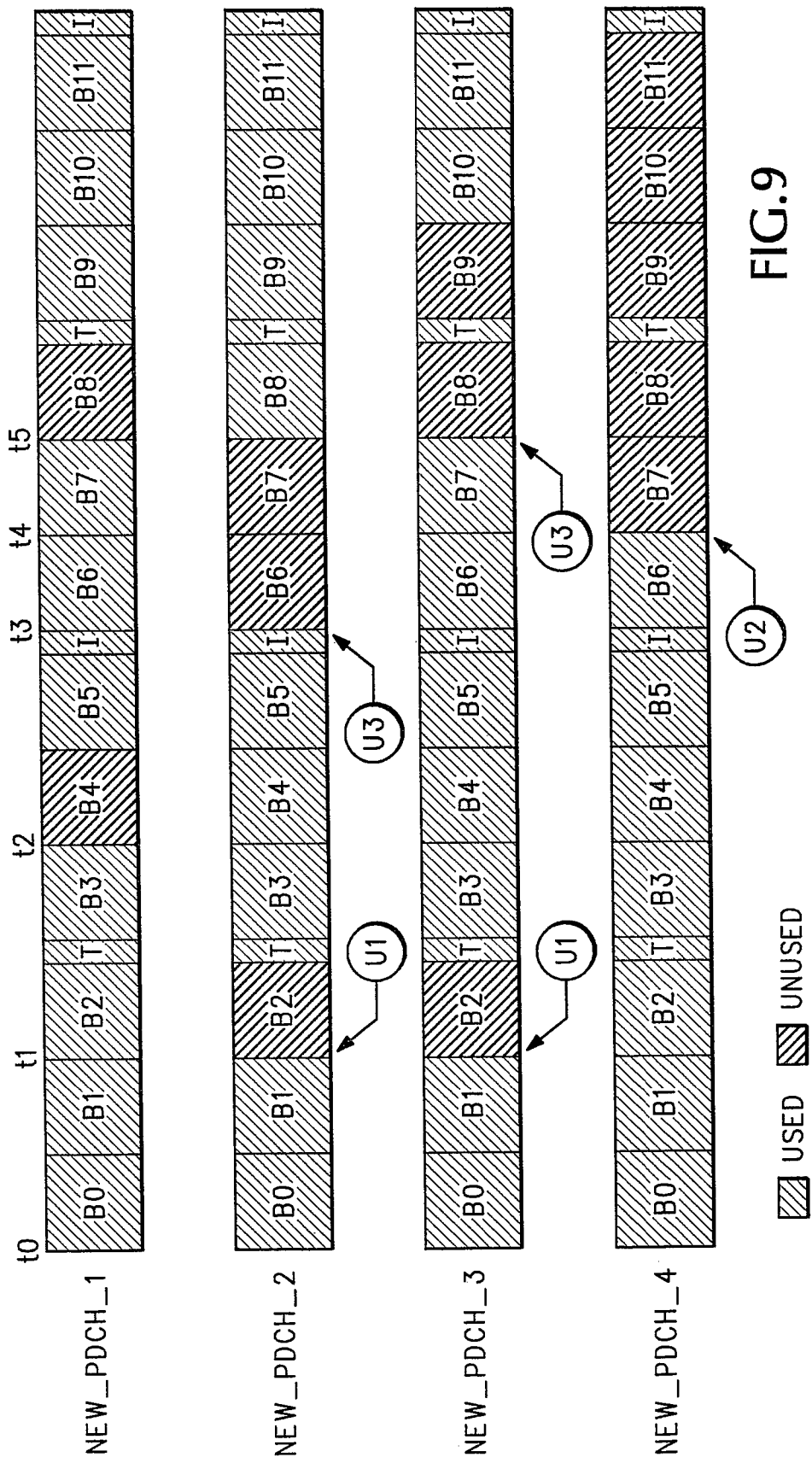
FIG. 9 depicts a representation of scheduling cavities and pseudo-dynamic allocation.

Non-forced Cavity, Pseudo-Dynamic Allocation—FIG. 9. If the traffic load is fairly low, not all blocks within a multi-frame are used. As a result, USF block allocation, specified in allocation block B0, contains cavities. The objective of this embodiment is to spread out such cavities over the multiframe to minimize initial allocation delay. The block and cavity allocation policy uses arrival rates and traffic profile information to determine cavity assignments across NEW_PDCHs. There is a trade-off between radio block usage and initial allocation delay minimization.

As illustrated in FIG. 9, cavities in the uplink NEW_PDCH_1, NEW_PDCH_2, NEW_PDCH_3 and NEW_PDCH_4 are distributed at regular intervals or late in the NEW_ PDCH's. This distribution allows a new user request to be allocated a cavity within typically 20-40 msecs. If all the NEW_PDCHs allocated radio blocks contiguously, hence leaving contiguous cavities at the end of allocation frames, a new user request would need to wait for approximately 120 msec for an uplink block.

New user requests are accommodated in any available cavities using pseudo-dynamic allocation. Pseudo-dynamic allocation uses a fixed allocation of blocks for a specified set of multi-frames, normally one, and then switches to allocation block B0 based dynamic allocation.

This method efficiently permits use of cavities without having to introduce any form of dynamic allocation for initial assignments, eliminates the need for additional signaling to switch the user from an initial fixed allocation to dynamic allocation, restricts power control and other operations for each radio block to specific MS and reduces delay in initial allocation of a radio block.

The resource allocation function allocates resources via USF assignment in B0 over the multi-frame, possibly leaving cavities to accommodate new users. However, as the traffic profile with users demanding immediate resources increases, a setup that enforces cavities at pre-determined blocks is used.

Forced cavity, pseudo-dynamic allocation. This method differs from the non-forced cavity method as follows: The resource allocation method predicts the number of users arriving within the multi-frame and ensures that specific blocks within a multi-frame are reserved for these new users arriving after allocation block B0. This operation implies that allocation block B0 will introduce cavities in the allocation frame to accommodate new user requests. This method is more effective when the arrival rate of users requiring low assignment delay is high.

In FIG. 9, U1 needs 1 block with minimum delay (NEW_PDCH 2 or 3), U2, needs 4 blocks, on NEW_PDCH 4 only with acceptable delay (t4- t1) and U3 needs 2 blocks (NEW_PDCH 3 or 4). If acceptable delay must be no more than (t-t2), the allocation uses NEW_PDCH_2. Alternatively, NEW_PDCH_3 is used if the network operates to hold NEW_PDCH_2 unused blocks for any (more recent) user (say U4, arriving before t3) needing immediate assignment. All users without USF allocation in B0 at t0, arriving within the multi-frame duration are granted blocks using single multi-frame pseudo-dynamic allocation and are transferred to standard GPRS dynamic-allocation starting with the next multi-frame onwards.

Re-allocating for a full-cavity NEW_PDCH. When sufficient blocks to accommodate a new user within the NEW_PDCH pool (same multi-frame duration) are unavailable or the initial setup delay requirements for users cannot be met, one or more TS's is used as a full cavity NEW_PDCH with no USF assignments at all. These NEW_PDCH's may be used as a launching pad for new users, that is, new users with tight delay requirements may be assigned resources from this cavity pool first before being reassigned to other resources from the non-cavity pool. The objective is to provide resources with minimal delay before the next multi-frame.

This embodiment of the NEW_PDCH supports standard GPRS/EGPRS or EDGE fixed allocation, thereby eliminating USF and power control considerations. A new user is kept on this full cavity NEW_PDCH, using pseudo-dynamic allocation, for as small a duration as necessary, before a resource re-allocation is done, onto the next available resource on another forced or non-forced NEW_PDCH, where it resumes with dynamic allocation. Additionally, since the message structure for pseudo-dynamic allocation allows for defining multiple blocks or multi-frames, a user can stay on this full cavity NEW_PDCH for more than one multi-frame.

Moving a forced or non-forced cavity NEW_PDCH to a full cavity NEW_PDCH (and vice-versa) happens 'dynamically' when the network senses the load profile to increase beyond specified thresholds. The network reassigns current users of the NEW_PDCH prior to doing so. Additional signaling overhead may result from the above procedures.

Pre-assigned full cavity NEW_PDCH. The signaling overhead as a consequence of moving a NEW_PDCH to a full cavity NEW_PDCH 'dynamically' may be too significant a drawback in some environments. Networks can pre-assign certain TS's as full cavity NEW_PDCHs co-existing with others as NEW_PDCHs.

Figure 10:
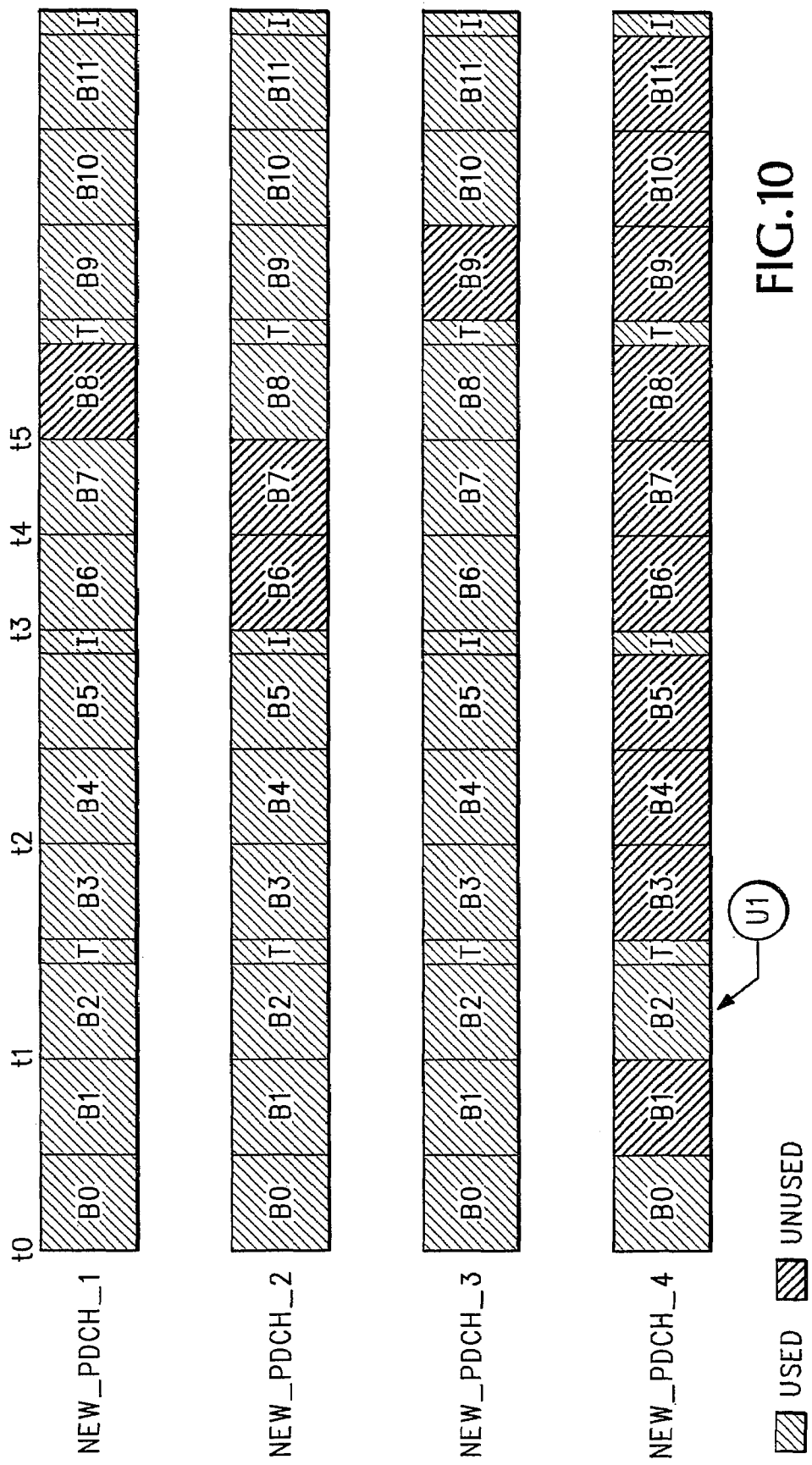
FIG. 10 depicts a representation of NEW_PDCHs including a full cavity NEW_PDCH.

In FIG. 10, all users without USF allocation in B0 at t0 (NEW_PDCH) arriving within the multi-frame duration are granted blocks using pseudo-dynamic allocation and are transferred to standard GPRS dynamic-allocation as soon as possible. The network determines that The number of available unused blocks is approaching requirements driven by traffic load and arrival rates. Cavities are not available early enough.

The available blocks may not satisfy users with immediate resource grant requirements, <t3-t0

The network is unable to allocate 4 consecutive blocks.

Under these conditions, a TS earlier used as NEW_PDCH_4 is now used as a full cavity NEW_PDCH initially providing only unused blocks. A new user (U1) can be granted resources, immediately (at t1, using standard GPRS fixed-allocation) for all multi-frames on this NEW_PDCH.

Additionally a greater-than-1 multi-frame pseudo dynamic allocation scheme is used on this NEW_PDCH. Users are moved off to a NEW_PDCH (using dynamic or 1 multi-frame pseudo-dynamic allocation) as resources become available on them.

Allocation Block Spare Bits. The vacant space not occupied by USF bits in a reservation set, such as block B0, can be used for other information. The vacant space is used just as any other PDCH block with the difference that this channel has a slightly lower data carrying capacity. In the B0 embodiment of a NEW_PDCH, some of the bits in the B0 block are used for USF information while other of the bits in block B0 are used for carrying data. The B0 block, therefore, has less data carrying capacity (by the USF bit amount) than blocks B1 through B11.

In one embodiment, the vacant space in the reservation set is used for MS measurement control. For example, control parameters such as signaling to begin or end measurement procedures are transmitted in the otherwise vacant space of the reservation set. This use is valuable in macrodiversity operations where changes in transmit/receive parameters or changes of transceivers are combined with measurement control to obtain down-link measurements uniquely tied to each transceiver.

In another embodiment, the vacant space in the reservation set is used for SMS (Short Messaging Service) and Paging. For example, instead of setting up a separate link for SMS (encroaching on the PDCH BW), short messages (SMs) for any of the MS users are included in the vacant space in the reservation set. The vacant space in the reservation set is also used as a paging channel for class C MS users.

In a further embodiment, the vacant space in the reservation set is used for timing advance information. This use can also free up the two bursts in each multi-frame that are otherwise reserved for the continuous TA procedure. The freed TA bursts are instead used, for example, for more interference measurement samples.

In an additional embodiment, the vacant space in the reservation set is used for timing advance information. For example, for cell system information such as packet SYS-INFO, updates are sent using otherwise vacant space on the reservation set channel (at times replacing the ACCH).

In a still additional embodiment, the vacant space in the reservation set is used for macrodiversity (MD) information.

In a still further embodiment, the vacant space in the reservation set is used for providing a Multicast Service since each MS within a group of MS users sharing the PDCH listens on this channel.

While the invention has been particularly shown and described with reference to preferred embodiments thereof it will be understood by those skilled in the art that various changes in form and details may be made therein without departing from the scope of the invention.

The invention claimed is:

1. A method comprising:
  transmitting, via a downlink channel, a frame to two or more communication units, a first portion of the frame including reservation set information and a second portion of the frame including allocation set information, wherein the allocation set information indicates a dynamically determined set of uplink channels that constitute an allocation set, and wherein the reservation set information indicates particular channels of the allocation set that are reserved for each of the two or more communication units;
  receiving uplink communications from at least one of the two or more communications units via the communications channels reserved thereto as indicated by the reservation set.

2. The method as recited in claim 1 further comprising, for one or more subsequent frames, dynamically changing the reservation set and allocation set.

3. The method as recited in claim 2, wherein the reservation set is dynamically changed based on one or more of the following parameters:
  allocation delay;
  traffic load;
  bandwidth efficiency.

4. The method as recited in claim 1, wherein the frame is a packet channel data (PDCH) channel having a plurality of blocks, wherein the first portion includes one or more of the plurality of blocks, and wherein the second portion includes one or more different ones of the plurality of blocks.

5. The method as recited in claim 4, wherein the reservation set information is transmitted in a first block of a downlink PDCH channel, and wherein the allocation set information includes one or more blocks of an uplink PDCH channel.

6. The method as recited in claim 4, wherein the reservation set information is transmitted in a subset of the plurality of blocks of a PDCH downlink channel comprising a group of downlink blocks, wherein each of the downlink blocks are distributed among the plurality of blocks such that the remaining ones of the plurality of blocks are divided into one or more uplink block groups comprising the allocation set information, and wherein at least one of the downlink blocks indicates channel reservations for a corresponding uplink block group.

7. The method as recited in claim 4, wherein the reservation set information is transmitted in a single block of a downlink PDCH channel, and wherein the allocation set information includes one or more blocks of an uplink PDCH channel, and wherein the single block is distributed among unique multi-frames within the PDCH channel.

8. The method as recited in claim 4, wherein the reservation set information is transmitted in a timing advance channel.

9. The method as recited in claim 1 further comprising transmitting said reservation set information and said allocation set information on a common control channel.

10. The method as recited in claim 9 further comprising each of the two or more communications units monitoring the common control channel.

11. The method as recited in claim 10, wherein the common control channel includes a broadcast channel.

12. The method as recited in claim 10, further comprising at least one of the two or more communications units monitoring the common control channel even if the common control channel includes a different carrier or time slot than that which is assigned to PDCH channels corresponding to the two or more communications units.

13. The method as recited in claim 1, further comprising controlling power of transmission bursts containing the reservation set information independently of power for other transmission bursts.

14. The method as recited in claim 13, further comprising controlling power of transmission bursts containing the reservation set information and training sequence information independently of power for other transmission bursts.

15. The method as recited in claim 1, wherein each of the two or more communications units is a cellular phone operating within a cell.

16. The method as recited in claim 1 further comprising each of the two or more communications units decoding the reservation set information to determine which uplink channels of the allocation set are allocated thereto.

17. A zone manager comprising:
a dynamic allocation unit configured to determine an allocation set and a reservation set, wherein the allocation set is a dynamically determined set of uplink channels and wherein the reservation set indicates particular channels of the allocation set that are reserved for each of one two or more communication units; and
a broadcast control unit coupled to the dynamic allocation unit, wherein the broadcast control unit is configured to cause one or more broadcasters to transmit a frame including, in a first portion of the frame, information specifying the reservation set and, in a second portion of the frame, information specifying the allocation set information to the two or more communications units.

18. The zone manager as recited in claim 17, wherein the dynamic allocation unit is configured to dynamically change the reservation set and the allocation set.

19. The zone manager as recited in claim 18, wherein the dynamic allocation unit is configured to dynamically change the reservation set based on one or more of the following parameters:
allocation delay;
traffic load;
bandwidth efficiency.

20. The zone manager as recited in claim 17, wherein the frame is a packet channel data (PDCH) channel having a plurality of blocks, wherein the first portion includes one or more of the plurality of blocks, and wherein the second portion includes one or more different ones of the plurality of blocks.

21. The zone manager as recited in claim 20, wherein the zone manager is configured to transmit information specifying the reservation set in a first block of a downlink PDCH channel, and wherein information specifying the allocation set includes one or more blocks of an uplink PDCH channel.

22. The zone manager as recited in claim 20, wherein the zone manager is configured to transmit information specifying the reservation set is in a subset of the plurality of blocks of a PDCH downlink channel comprising a group of downlink blocks, wherein each of the downlink blocks are distributed among the plurality of blocks such that the remaining ones of the plurality of blocks are divided into one or more uplink block groups that constitute information specifying the allocation set and wherein at least one of the downlink blocks indicates channel reservations for a corresponding uplink block group.

23. The zone manager as recited in claim 20, wherein the zone manager is configured to transmit information specifying the reservation set in a single block of a downlink PDCH channel, and wherein information specifying the allocation set includes one or more blocks of an uplink PDCH channel, and wherein the single block is distributed among unique multi-frames within the PDCH channel.

24. The zone manager as recited in claim 20, wherein the zone manager is configured to transmit information specifying the reservation set in a timing advance channel.

25. The zone manager as recited in claim 17, wherein the zone manager is configured to transmit information specifying the reservation set is on a common control channel.

26. The zone manager as recited in claim 17, wherein the broadcast control unit is configured to cause the power of transmission bursts containing information specifying the reservation set to be controlled independently of power for other transmission bursts.

27. The zone manager as recited in claim 26, wherein the broadcast control unit is configured to cause the power of transmission bursts containing information specifying the reservation set and training sequence information to be controlled independently of power for other transmission bursts.

28. The zone manager as recited in claim 17, wherein the broadcast control unit is coupled to a plurality of broadcasters.

29. The zone manager as recited in claim 28, wherein the plurality of broadcasters are located at micro-diverse locations with respect to other.

30. The zone manager as recited in claim 28, wherein the plurality of broadcasters are located at macro-diverse locations with respect to other.

31. A communications system comprising:
two or more mobile communications units;
a zone manager, the zone manager including:
a dynamic allocation unit configured to determine an allocation set and a reservation set, wherein the allocation set is a dynamically determined set of uplink channels, and wherein the reservation set indicates particular channels of the allocation set that are reserved for each of two or more communication units; and
a broadcast control unit coupled to the dynamic allocation unit; and
one or more broadcasters coupled to the broadcast control unit, wherein the broadcast control unit is configured to cause one or more broadcasters to transmit a frame to the two or more communication units, the frame including, in a first portion of the frame, information specifying the reservation set and, in a second portion of the frame, information specifying the allocation set.

32. The communications system as recited in claim 31, wherein the dynamic allocation unit is configured to dynamically change the reservation set and the allocation set.

33. The communications system as recited in claim 32, wherein the dynamic allocation unit is configured to dynamically change the reservation set based on one or more of the following parameters:
allocation delay;
traffic load;
bandwidth efficiency.

34. The communications system as recited in claim 31, wherein the frame is a packet channel data (PDCH) channel having a plurality of blocks, wherein the first portion includes one or more of the plurality of blocks, and wherein the second portion includes one or more different ones of the plurality of blocks.

35. The communications system as recited in claim 34, wherein the broadcast control unit is configured to transmit the reservation set information in a first block of a downlink PDCH channel, and wherein the allocation set information includes one or more blocks of an uplink PDCH channel.

36. The communications system as recited in claim 34, wherein the broadcast control unit is configured to transmit the reservation set information in a subset of the plurality of blocks of a PDCH downlink channel comprising a group of downlink blocks, wherein each of the downlink blocks are distributed among the plurality of blocks, and wherein the broadcast unit is further configured to divide the remaining ones of the plurality of blocks into one or more uplink block groups comprising the allocation set information, and wherein each of the downlink blocks indicates channel allocations for a corresponding uplink block group.

37. The communications system as recited in claim 34, wherein the broadcast control unit is configured to transmit the reservation set information in a single block of a downlink PDCH channel, and wherein the allocation set information includes one or more blocks of an uplink PDCH channel, and wherein the single block is distributed among unique multi-frames within the PDCH channel.

38. The communications system as recited in claim 34, wherein the broadcast control unit is configured to transmit the reservation set information in a timing advance channel.

39. The communications system as recited in claim 31, wherein the broadcast control unit is configured to transmit the reservation set information on a common control channel.

40. The communications system as recited in claim 39, wherein the common control channel includes a broadcast channel.

41. The communications system as recited in claim 39, wherein at least one of the two or more mobile communications units is configured to monitor the common control channel even if the common control channel includes a different carrier or time slot than that which is assigned to PDCH channels corresponding to the two or more communications units.

42. The communications system as recited in claim 31, wherein the broadcast control unit is configured to cause the power of transmission bursts containing the reservation set information to be controlled independently of power for other transmission bursts.

43. The communications system as recited in claim 42, wherein the broadcast control unit is configured to cause the power of transmission bursts containing the reservation set information and training sequence information to be controlled independently of power for other transmission bursts.

44. The communications system as recited in claim 31, wherein each of the two or more communications units is a cellular phone operating within a cell.

45. The communications system as recited in claim 31, wherein each of the two or more communications units is configured to decode the reservation set information to determine which uplink channels are assigned thereto.

46. The communications system as recited in claim 31, wherein the broadcast control unit is coupled to a plurality of broadcasters.

47. The communications system as recited in claim 46, wherein the plurality of broadcasters are located at micro-diverse locations with respect to each other.

48. The communications system as recited in claim 46, wherein the plurality of broadcasters are located at macro-diverse locations with respect to each other.

49. A method for operating a mobile phone, the method comprising:
  the mobile phone receiving a frame concurrently transmitted to at least one other mobile phone, the frame having a first portion including reservation set information and a second portion including allocation set information, wherein the allocation set information is indicative of a dynamically determined set of uplink channels that constitute an allocation set, and wherein the reservation set information indicates particular channels of the allocation set that are reserved for the mobile phone;
  determining, based on the reservation set information, which of the particular uplink channels of the allocation set are reserved for the mobile phone; and
  transmitting information on the particular uplink channels.

* * * * *

UNITED STATES PATENT AND TRADEMARK OFFICE
CERTIFICATE OF CORRECTION

PATENT NO. : 7,643,423 B2
APPLICATION NO. : 11/507789
DATED : January 5, 2010
INVENTOR(S) : Chillariga et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 629 days.

Signed and Sealed this

Sixteenth Day of November, 2010

David J. Kappos
*Director of the United States Patent and Trademark Office*